United States Patent
Zhao et al.

(10) Patent No.: US 7,836,502 B1
(45) Date of Patent: Nov. 16, 2010

(54) SCHEDULED GATEWAY SCANNING ARRANGEMENT AND METHODS THEREOF

(75) Inventors: Xiaoming Zhao, Nanjing (CN); Gang Chen, Nanjing (CN); Eric Chang, Taipei (TW)

(73) Assignee: Trend Micro Inc., Cupertino, CA (US)

( * ) Notice: Subject to any disclaimer, the term of this patent is extended or adjusted under 35 U.S.C. 154(b) by 754 days.

(21) Appl. No.: 11/773,072

(22) Filed: Jul. 3, 2007

(51) Int. Cl.
*G06F 11/00* (2006.01)
*H04L 9/32* (2006.01)

(52) U.S. Cl. .............................. 726/22; 726/26; 726/27

(58) Field of Classification Search ............. 726/11–12, 726/22–30; 713/187–188
See application file for complete search history.

(56) References Cited

U.S. PATENT DOCUMENTS 6,735,700 B1 * 5/2004 Flint et al. ..................... 726/24

OTHER PUBLICATIONS

Nielsen, Jakob, "Zipf Curves and Website Popularity", http://www.useit.com/alertbox/zipf.html, 1997, ISSN: 1548-552, pp. 1-3.

Breslau, Lee et al, "Web Caching and Zipf-Like Distributions: Evidence and Implications", http://citeseer.ist.psu.edu/cache/papers/cs/8063/http:zSzzSzwww.cs.princeton.eduzSzcourseszSzarchivezSzspr99zSzcs598bzSzweb cache.pdf/breslau98web.pdf, pp. 1-25, 1999.
Handurukande, S.B. et al, "Peer Sharing Behaviour in the eDonkey Network, and Implications for the Design of Server-less File Sharing Systems", http://pauillac.inria.fr/~lefessan/papers/RR-5506.pdf, INRIA, France, 2005, ISSN: 0249-6399, pp. 1-41.

* cited by examiner

*Primary Examiner*—Hosuk Song
(74) *Attorney, Agent, or Firm*—IP Strategy Group, P.C.

(57) ABSTRACT

A method for performing content analysis of a plurality of resources is provided. The method includes performing background content scanning on the plurality of resources based on a resource priority queue. The method also includes storing already scanned resources of the plurality of resources in a scan result database. The method further includes receiving a first access request asynchronously with the scanning and the storing. The method yet also includes, if the first access request pertains to a given resource not contemporaneously designated as a satisfactory scan result according to the scan result database, granting the given resource a higher priority in the resource priority queue than resources remaining to be scanned in the plurality of resources, thereby enabling the given resource to be scanned ahead of the resources remaining to be scanned.

20 Claims, 8 Drawing Sheets

SCHEDULED GATEWAY SCANNING ARRANGEMENT AND METHODS THEREOF

BACKGROUND OF THE INVENTION

Advances in computers have proliferated the usage of computers, especially in a business environment. In a typical business environment, an integrated network may enable resources to be shared among a plurality of users. In an example, a document may be saved on a centralized server in order to facilitate collaboration between users geographically dispersed. In another example, software updates may be centrally saved and be accessible to users throughout the company. Because of widespread computer usage, for some companies, the volume of data that may be shared has become quite large.

To facilitate discussion, FIG. 1 shows a simple block diagram of a network environment. A network environment 100 may include a plurality of computer clients (102, 104, and 106). The plurality of computer clients may be trying to access a set of shared resources 112 through a server 110, which may be employed to handle a client's request for access to set of shared resources 112. To access the shared resources, the plurality of computer clients may employ a plurality of communication channels 108. In an example, computer client 102 may employ a file transfer protocol (FTP) to download an application program from set of shared resources 112. In another example, computer client 102 may employ a hypertext transfer protocol (HTTP) to access a document stored in set of shared resources 112.

Although an integrated network may enable shared resources to be dispersed more easily, an integrated network may also facilitate the spread of malicious code (e.g., viruses, malware, etc.). In an example, a document infected by a virus is uploaded onto an integrated network. Accordingly, any computer client that may access the infected document may be at risk. Thus, in an integrated network environment, malicious code may easily and quickly spread throughout the network, creating havoc not only to the network but also to the individual computers that may be attached to the network.

Many content security solutions have been implemented by companies in an attempt to prevent the spread of malicious codes. For example, a dedicated scanner may be attached to a server. When a computer client's access request is received by the server, the server may employ the dedicated scanner to scan the requested resource before releasing the resource to the computer client. Unfortunately, dedicated scanners tend to employ proprietary protocols to communicate with servers, thereby causing resources that are not configured to use the specific protocols from being scanned. As a result, a company may implement a plurality of dedicated scanners to handle the different types of protocols or the resource may be released without being scanned.

In addition, some of the resources may be fairly large, thereby requiring a long scanning time. To prevent the dedicated scanner from consuming the processing resource for an extended period of time, a time limit may be implemented. Accordingly, if the time required to scan the resource exceeds the time limit, then a request timeout may occur, preventing the computer client from accessing the resource.

Another content security solution may include installing a scanner inside a gateway, which is disposed between the computer clients and the shared resources. In this solution, the gateway may intercept the access request and the gateway scanner may scan the resource traffic when the server responds to a client's access request. Similar to the dedicated scanner, performance issue may arise if the resource being scanned is too large and a request timeout may occur.

Yet another content security solution may include scanning the shared resources offline by employing a scheduled scanner. Although the scheduled scanner arrangement may be employed to scan both large and small size resources offline, the scheduled scanner is usually not configured to perform real-time scanning. Consider the situation wherein, for example, an access request is received by a server for a resource that has not yet been scanned. Since, the scheduled scanner arrangement does not provide for real-time scanning, the resource that has not yet been scanned may he accessible to the computer client. Accordingly, the computer client may be unnecessarily exposed to potential malware attack. Another shortcoming of scheduled scanner is that the scheduled scanner almost never finishes scanning in a reasonable time period for large-scaled shared resources, thereby making the scheduled scanning arrangement a less-attractive solution.

BRIEF SUMMARY OF THE INVENTION

The invention relates, in an embodiment to a method for performing content analysis of a plurality of resources. The method includes performing background content scanning on the plurality of resources based on a resource priority queue. The method also includes storing already scanned resources of the plurality of resources in a scan result database. The method further includes receiving a first access request asynchronously with the scanning and the storing. The method yet, also includes, if the first access request pertains to a given resource not contemporaneously designated as a satisfactory scan result according to the scan result database, granting the given resource a higher priority in the resource priority queue than resources remaining to be scanned in the plurality of resources, thereby enabling the given resource to be scanned ahead of the resources remaining to be scanned.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing, computer readable code. Further, the invention may also cover apparatuses for practicing embodiments of the invention. Such apparatus may include circuits, dedicated and/or programmable, to can out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, an integrated network may include a plurality of resources that may be shared by a plurality of clients (e.g., computers, laptops, smart devices, PDA, etc.) geographically dispersed. Since the shared resources may be accessed by a plurality of clients, the ability for an infected resource to spread throughout the network is more likely. To prevent the possibility of an infected shared resource from spreading, a company may employ a scanner to identify and handle malicious code. As aforementioned, a plurality of content security solutions has been implemented, including employing a dedicated scanner, employing a gateway scanner, and employing a scheduled scanner.

Figure 1:
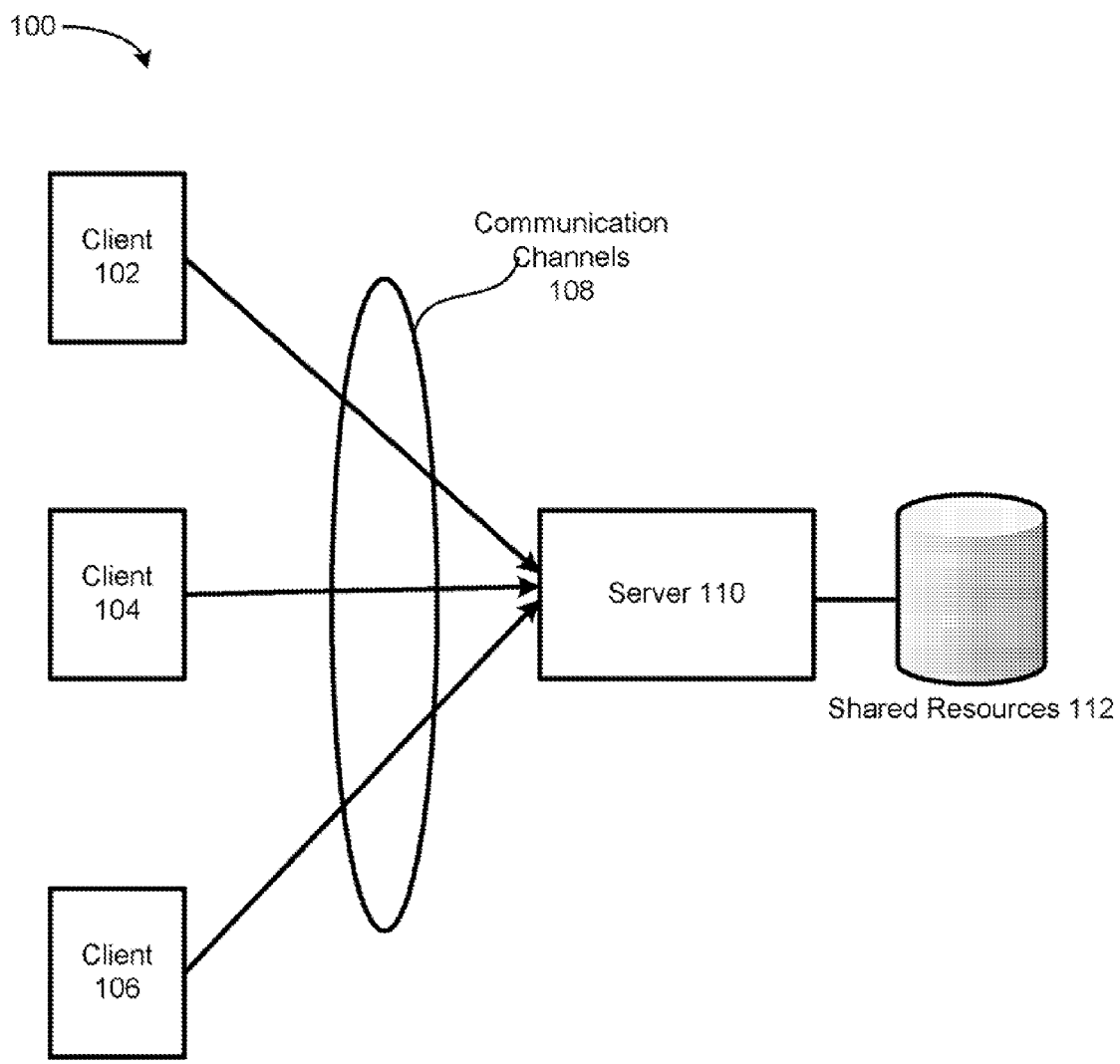
FIG. 1 shows a simple block diagram of a network environment.
Figure 2:
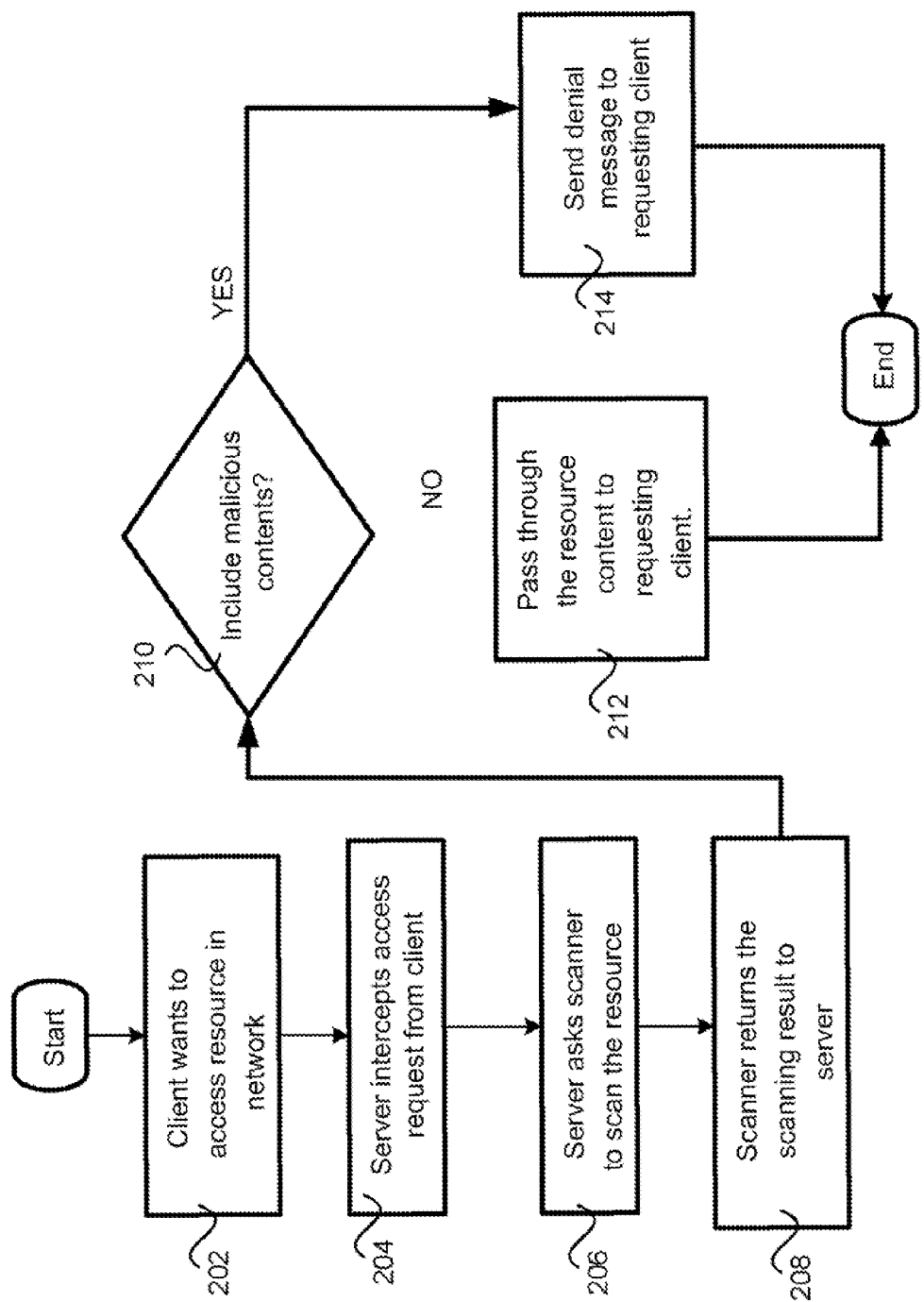
FIG. 2 shows a simple flow chart illustrating a dedicated scanner model.

A content security solution that companies may implement is a dedicated scanner for identifying and handling malicious code. To facilitate discussion, prior art FIG. 2 shows a simple flow chart illustrating a dedicated scanner arrangement. Prior art FIG. 2 will be discussed using prior art FIG. 1 as an example. In a dedicated scanner arrangement, a dedicated scanner may be connected to a server 110.

At a first step 202, a computer client may want to access a shared resource on the network. In an example, a user at computer client 102 may send an access request to access a the from set of shared resources 112.

At a next step 204, a server may intercept access request from the client computer. In an example, server 110 may intercept the aforementioned client's access request.

At a next step 206, the server may direct a dedicated scanner to scan the resource. in other words, before granting access to computer client 102, server 110 may invoke a dedicated scanner to scan the requested file. The purpose of invoking the dedicated scanner is to prevent malicious code from spreading.

At a next step 208, the dedicated scanner may return the scanning result to the server.

At a next step 210, if malicious content is not identified by the dedicated scanner, then at a next step 212, the server may pass through the resource content to the requesting computer client. In an example, since the dedicated scanner is not able to identify any malicious code associated with the requested file, server 110 may allow computer client 102 to access the file from set of shared resources 112.

However, if the dedicated scanner is able to locate malicious content in the file (next step 210), then at a next step 214, a denial message is sent to the computer client. In an example, since the dedicated scanner is able to identify malicious content in the requested file, server 110 may send a denial message (e.g., access denied) to prevent computer client 102 from accessing the file.

While the dedicated scanner arrangement may help prevent malicious code from spreading, there are limitations. For example, most dedicated scanner may employ a proprietary protocol for communicating with the server. Thus, resources located on servers employing incompatible scanner interface and/or protocols may not he scanned. As a result, a plurality of dedicated scanners may be employed in order to cover at least some of the common protocols.

In addition, a dedicated scanner arrangement may suffer from performance limitation. Since a resource is not scanned until a client's access request is received by a server, the wait time a computer client may experience may depend upon the size of the resource. To prevent one resource from consuming too much of the processing bandwidth of the server, the server may limit the amount of time that a dedicated scanner max utilize to scan a resource. One method for limiting consumption of processing resources is to cause a request timeout when the scanning time exceeds a pre-determined time period. Additionally or alternatively, another method for limiting consumption of processing resources is to provide an exception for resources of certain size limit to bypass the scanning requirements. Unfortunately, both methods do not provide a satisfactory experience to the user. In the first method, the user is unable to access the requested resource and may become frustrated during the process. In the second method, although the user is provided access to the requested resource, the user may be exposed to malicious code that may cause detrimental consequences, such as loss of data.

Figure 3:
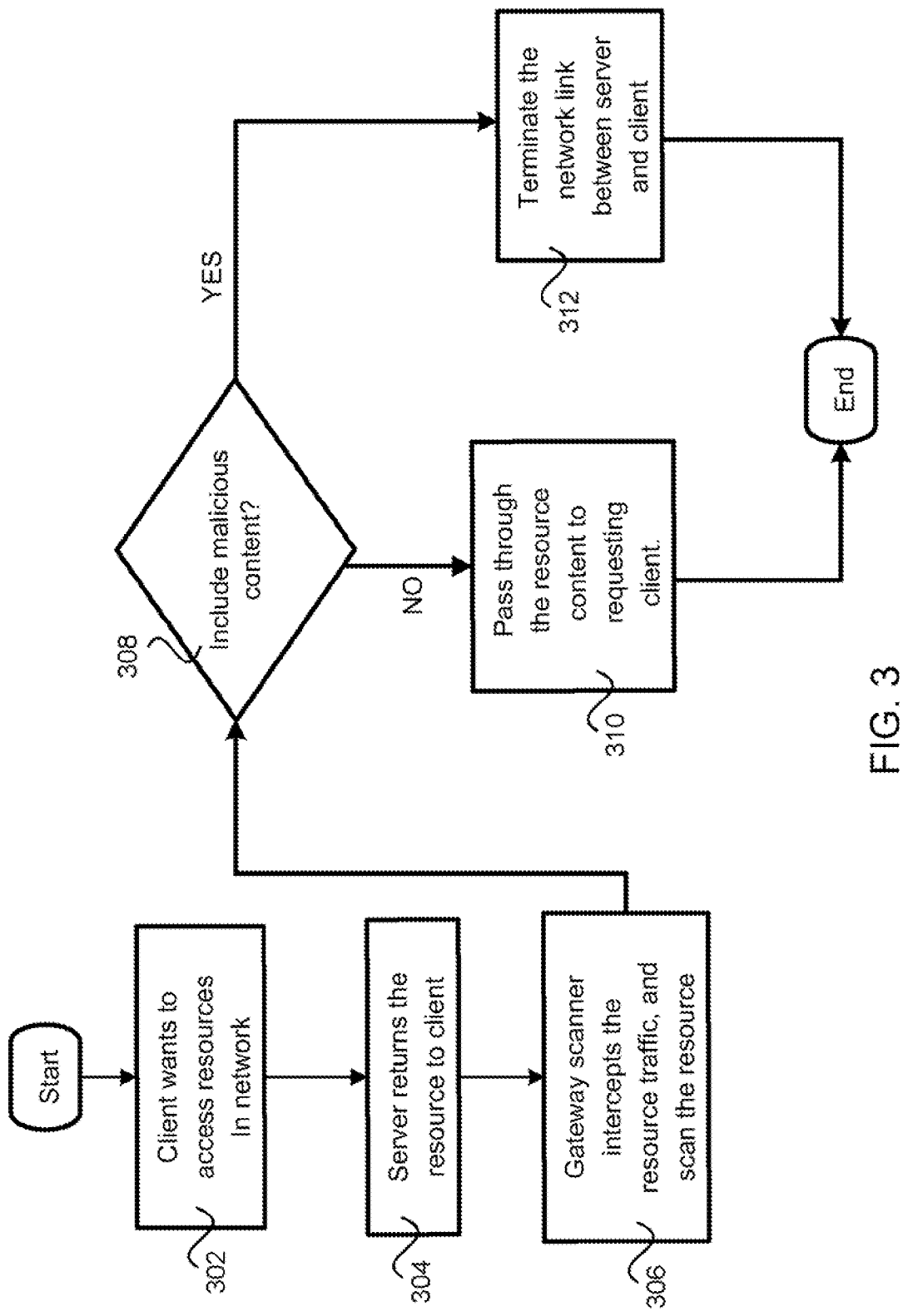
FIG. 3 shows a simple flow chart illustrating a gateway scanner model.

Another content security solution that companies may implement is a gateway scanner arrangement, as shown in prior art FIG. 3. Prior art FIG. 3 will be discussed using prior art FIG. 1 as an example. In a gateway scanner arrangement, a scanner may be positioned between a computer client and a server.

At a first step 302, a computer client may want to access a resource on the network. In an example, a user at computer client 104 may send an access request to access a file from set of shared resources 112.

At a next step 304, a server may return the resource to the computer client. In an example, server 110 may retrieve the file requested by client computer 104 and may send the requested file to computer client 104.

At a next step 306, a gateway scanner may intercept the resource traffic and scan the resource. In an example, the access request may be intercepted at the gateway by a scanner. The gateway scanner may use an in-line scanner module to filter the communication stream between the computer client and the server. Before allowing the resource to pass through, the gateway scanner may perform a real-time scan.

At a next step 308, if malicious content is not identified by the gateway scanner, then at a next step 310, the gateway scanner may pass through the resource content to the requesting client. In an example, since the gateway scanner is not able to identify any malicious code associated with the requested file, gateway scanner may forward the requested file to computer client 104.

However, if the gateway scanner is able to locate malicious content in the file (step 308), then at a next step 312, the gateway scanner may terminate the network link between server 110 and computer client 104. The network link is terminated in order to prevent the infected resource from being downloaded onto the unsuspecting computer.

While the gateway scanner arrangement may help prevent malicious code from spreading, there are limitations. One limitation is that a gateway scanner is usually unable to scan partial files. In other words, gateway scanner may be able to scan resources accessed via stream-based access protocols (e.g., HTTP, FTP, etc.); however, gateway scanner may not be able to scan resources accessed through random access protocols, such as network file system (NFS) and common internet file system (CIFS) since resources access through these protocols (i.e., CIFS, NFS) may usually result in partial files. As a result, the partial files may be accessed by the computer clients without first being scanned, thereby exposing the computer clients to potential malicious malware.

In addition, a gateway scanner model may suffer from performance limitation. Since a resource is usually scanned in real-time (i.e., when the resource traffic is intercepted by a gateway scanner), the wait time a computer client may experience may depend upon the size of the resource. To minimize the wait time, the gateway scanner may implement a request timeout when the amount of time the gateway scanner may utilize to scan a resource exceeds a pre-determined time period. This method may cause user's frustration since the user not only wait for a "long" time while the scanning is occurring, but the user is also not provided with the requested resource if the resource is deemed to be infected. To improve user's experience, the gateway scanner may be programmed to allow resources larger than a pre-determined size to be passed through. Unfortunately, this method exposes the computer client to potential malicious code.

Figure 4:
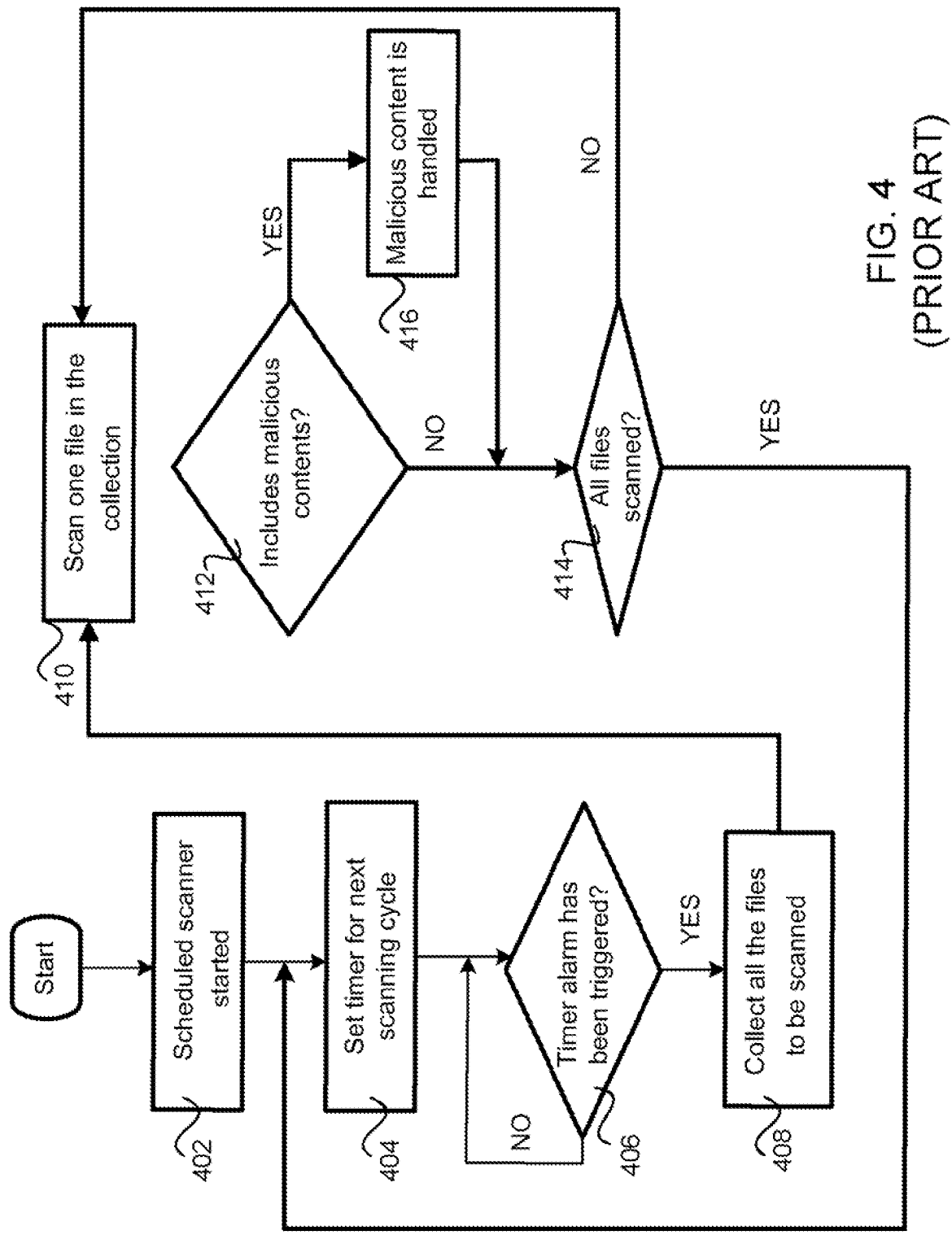
FIG. 4 shows a simple flow chart illustrating a scheduled scanner model.

Another content security solution that companies may implement is a scheduled scanner, as shown in prior art FIG. 4. Prior art FIG. 4 will be discussed using prior art FIG. 1 as an example. In a scheduled scanner arrangement, a scanner may be connected to server 110 to perform offline scanning.

At a first step 402, a scheduled scanner is started.

At a next step 404, a timer is set for the next scanning cycle.

At a next step 406, the scheduled scanner may check the timer to determine if the timer alarm has been triggered. If the timer alarm has not been triggered then the scheduled scanner may continue to wait. However, if the timer alarm has been triggered, then the scheduled scanner may collect the resources that may be scanned, at a next step 408. In an example, the scheduled scanner may scan each of the resources from set of shared resources 112.

At a next step 410, the scheduled scanner may scan a file in the collection of files. If malicious content is not identified at a next step 412, then the scheduled scanner may check, at a next step 414, whether all files have been scanned. If all files have been scanned, then the scanning cycle has completed and the schedule scanner returns to step 404 to wait for the next scanning cycle. However, if all files have not been scanned, then the scheduled scanner may return to step 410 to scan the next file.

Referring back to step 412, if the scheduled scanner identifies malicious content in the file, then at a next step 416, the malicious content is handled. In an example, the malicious code may be removed. Alternatively or additionally, the malicious content may be quarantined until the file has been handled. If the resource is unsalvageable, the resource may be deleted.

Although the scheduled scanner arrangement may be employed to handle potential malicious code, the scheduled scanner arrangement does not provide for real-time scanning. As a result, resources that may not have been scanned or recently scanned may be accessed by computer clients without undergoing scanning, thereby exposing the computer clients to unnecessary risk.

In addition, the scheduled scanner arrangement may provide for scanning of all resources from set of shared resources. For some companies, the amount of resources that may be scanned may be ten of millions and/or terabytes of file data. Thus, each time a scan cycle occurs, the cycle may require hours or even days to be completed. In addition, each time the scheduled scanner is updated with a new virus pattern, the scan cycle may be restarted. As can be appreciated from the foregoing, the scheduled scanner arrangement may not be feasible for protecting large scale shared resources.

In one aspect of the invention, the inventors herein realized that a content security solution is not truly effective if the risk of malicious code being spread throughout the network is not reduced to some acceptably low level. To prevent the spread of malicious code, the inventors realized that an arrangement needs to provide real-time scanning. Since large resources tend to experience timeout during real-time scanning, the inventors also realized that the arrangement needs to also support background scheduled scanning so that some of the shared resources, especially the large-size resources, may be pre-scanned.

In accordance with embodiments of the invention, a scheduled gateway scanning arrangement (SGSA) is provided in which real-tune scanning is integrated with scheduled scanning. With the SGSA, a content security solution is provided in which the risk of spreading malicious code is substantially eliminated. Embodiments of the invention include different components (e.g., scheduler, resource priority queue, background malware scanner, request proxy, etc.) that may work with one another to intercept an access request in order to ensure that the requested resource is malware-free before being made accessible.

In this document, various implementations may be discussed using a single server as an example. As can be appreciated from the foregoing, the configuration of a network may vary from company to company. In an example, a small company may only have one server. However, for a lane company, such as Trend Micro, Inc., the number of servers may easily exceed a few hundreds. The discussions are meant as examples and the invention is not limited by the examples presented.

In an embodiment of the invention, the SGSA may include a request proxy, a scheduler, a resource priority queue, and a background malware scanner. Each of the components may interact with one another to prevent the spreading of malicious code. Consider the situation wherein, for example, a client may request access to a shared resource. In an embodiment, the request proxy may be configured to intercept the access request. By intercepting the access request, the request proxy may acts as a gatekeeper. In other words, if the request proxy is not satisfied that the requested resource is malware-free, the request proxy may deny the client access to the resource.

The request proxy may perform its task by retrieving the scan result for the requested resource from the scheduler. In an embodiment, the scheduler is configured to determine the priority score of a resource. The scheduler may create the priority score based on different criteria, including but are not limited to, the size of the resource, the resource access frequency rate, and the resource recent scanning performance data (e.g. scanning time consumption). As discussed herein, a resource access frequency rate refers to the frequency at which a resource is accessed. Also, as discussed herein, a resource scanning performance data refers to the speed at which a resource may be scanned.

The scheduler may employ the priority score to create the resource priority queue. Thus, resources having the same priority score requiring scanning are placed onto the queue in a FIFO (first-in first-out) manner. A resource having a higher priority score will be placed ahead of lower scored resources in the resource priority queue enabling the higher priority score resource to be scanned before the lower priority resource scanned.

In an embodiment, the resource priority queue may be adjusted to allow for real-time scan when an access request is received In an example, if the scan result is not available for a requested resource, the scheduler may adjust the resource priority queue to move the requested resource to the head of the queue. In other words, the priority score for the requested resource may be changed to that of the highest priority score, thereby enabling the requested resource to be placed ahead of the other resources in the resource priority queue.

To enable real-time scanning, a scanner, such as a background malware scanner, may be employed. As can be appreciated from the foregoing, the number of background malware scanners that may be available to perform the scanning may depend upon a company's configuration preference. The background malware scanner may be configured to scan the shared resources in the order as defined by the resource priority queue, in an embodiment. Thus, when the scheduler adjusts the resource priority queue to change the priority of the requested resource to that of the highest priority, the background malware scanner may automatically perform a scan on the requested resource since the requested resource may have the highest priority of all the unscanned resources in the resource priority queue.

Once the scan result has been sent back to the request proxy, the request proxy may make a determination on how to best handle the intercepted access request, in an embodiment. The request proxy may pass the access request to the server if the scan result indicates no malicious content. However, the request proxy may withhold the access request and send a denial message to the requestor if the requested resource is determined to be infected.

The features and advantages of the present invention may be better understood with reference to the figures and discussions that follow.

Figure 5:
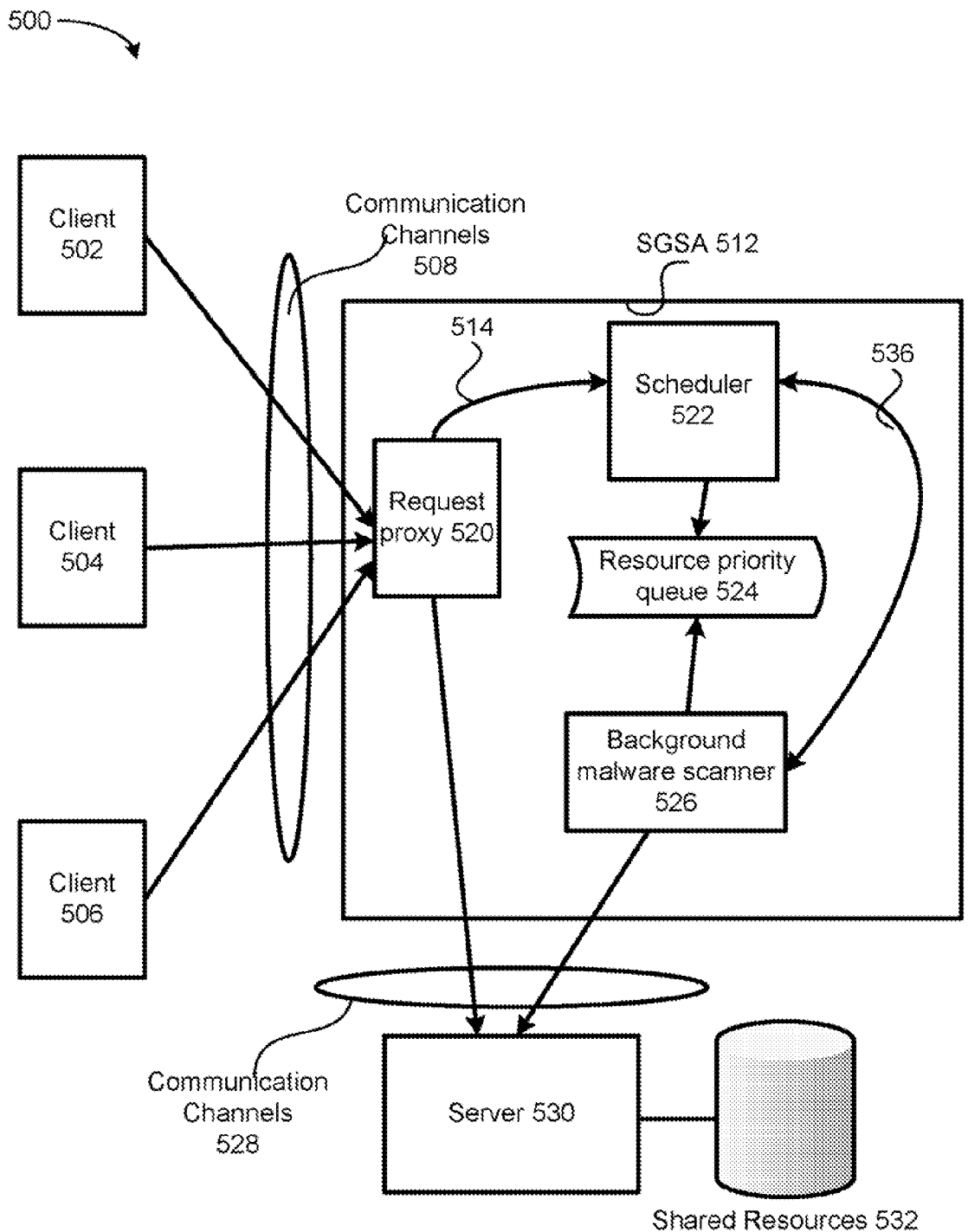
FIG. 5 shows, in an embodiment of the invention, a simple block diagram of a network environment with a scheduled gateway scanning arrangement (SGSA).

FIG. 5 shows, in an embodiment of the invention, a simple block diagram of a network environment with a scheduled gateway scanning arrangement (SGSA). A network environment 500 may include a plurality of clients (502, 504, and 506). The clients may be any device capable of accessing a network to access a resource. The clients may include, but are not limited to, a computer, a mobile device, a personal digital assistant (PDA), a smart device, and the like.

The clients may connect to network arrangement 500 via a plurality of communication channels 508 to access a set of shared resources 532. The communication channels may include but are not limited to, HTTP, FTP, NTS, CIFS, and the like.

The request for a resource from set of shared resources 532 from the clients may be intercepted by an SGSA 512, which may be configured to identify and handle malicious code. In an embodiment, SGSA 512 may be a gateway and may be disposed between the clients and the server, thereby enabling SGSA 512 to employ the same protocol as that being utilized by the clients and the server. In an example, if client 502 is communicating with server 530 via an HTTP protocol, then SGSA 512 may employ the HTTP protocol to intercept and handle the access request from client 502 to server 530.

In an embodiment, SGSA 512 may be a gateway with both scheduled scanning and real-time scanning capability. In other words, SGSA 512 may scan the shared resources based on a scanning cycle. However, real-time scanning is also provided when a resource that has not yet been scanned is requested by a client. To facilitate the process, SGSA 512 may include a request proxy 520, a scheduler 522, a resource priority queue 524, and a background malware scanner 526, in an embodiment.

In an embodiment, request proxy 520 may intercept a client's request for a shared resource. Request proxy 520 may send a request along a path 514 to scheduler 512 to retrieve the scan result for the requested resource. If the resource has not yet been scanned, then request proxy 520 may wait until the resource has been scanned. Once the scan result is available, request proxy 520 may terminate the network connection and/or send an error message back to the client if the resource includes malicious content. However, if the resource is malware-free, request proxy 520 may send the client's request to a server 530 through a second set of communication channels 528 to retrieve the requested resource from set of shared resources 532.

In an embodiment, SGSA 512 may include scheduler 522, which may be configured to determine the priority score of a resource. To calculate the priority score, scheduler 522 may take into consideration the recent resource access frequency rate, in an embodiment. As discussed herein, a resource access frequency rate refers to the frequency at which a resource is accessed. In determining the priority score, the scheduler may give a higher priority to the resources with a larger resource access frequency rate.

Additionally, scheduler 522 may also consider the recent resource scanning time consumption on a per resource basis to determine the priority score. As discussed herein, a resource scanning time consumption refers to the speed at which a resource may be scanned. In an embodiment, resources with longer scanning time consumption may be given a higher priority, thereby increasing the likelihood that the resources may be pre-scanned during a scheduled scanning cycle and reducing the average real-time scanning time consumption.

In an embodiment, scheduler 522 may also be configured to change the priority score of a resource when the resource is being requested by a client. In an example, when request proxy 520 requests for the scan result of a resource, scheduler 522 may change the priority score of the requested resource to that of the highest priority if the requested resource has yet to be scanned. By changing the priority score, resource priority queue 524 may be updated; thereby, the order in which a resource is scanned by background malware scanner 526 may be updated to enable real-time scanning of the requested resource. By rearranging the priority score, scheduler 522 is able to provide request proxy 520 with a scan result from which request proxy 520 may be able to determine how best to handle the client's access request.

In an embodiment of the invention, SGSA 512 may also include background malware scanner 526, which is configured to scan resources from set of shared resources 532 for malicious code. In an embodiment, background malware scanner 526 may be performing background scanning even though no client's access request has been received by SGSA 512.

A resource may be identified for back-ground scanning based on a statistical prediction of resources likely to be accessed. The prediction may be based on the resources previously accessed or based on resources accessed by similar users and/or organizations. For example, if a user accesses a certain news website frequently, new news items from that same web site or news items from other similarly suitable news sites may be back-ground scanned. If a previously accessed uniform resource locator (URL) has not been scanned for some times and the user has a habit of checking this website, background scanning may be performed. In another example, if the tax code change causes many accountants to access a certain tax discussion forum, the tax discussion forum content may be background scanned in anticipation of access by a given accountant. The sharing of this type of access pattern/data may be coordinated among the background scanners for various companies and such coordination may be provided via the interact, for example.

In an embodiment, background malware scanner 526 may be scanning the resources based on resource priority queue 524. Since background malware scanner 526 is scanning the resources in the order as dictated by resource priority queue 524, real-time scanning may occur when scheduler 522 adjust the priority score to move a requested resource forward in queue. Once scanning has been completed, in an embodiment, background malware scanner 526 is configured to send the scan result and resource scanning performance data (e.g., scanning time consumption) to scheduler 520 via a path 536.

Figure 6:
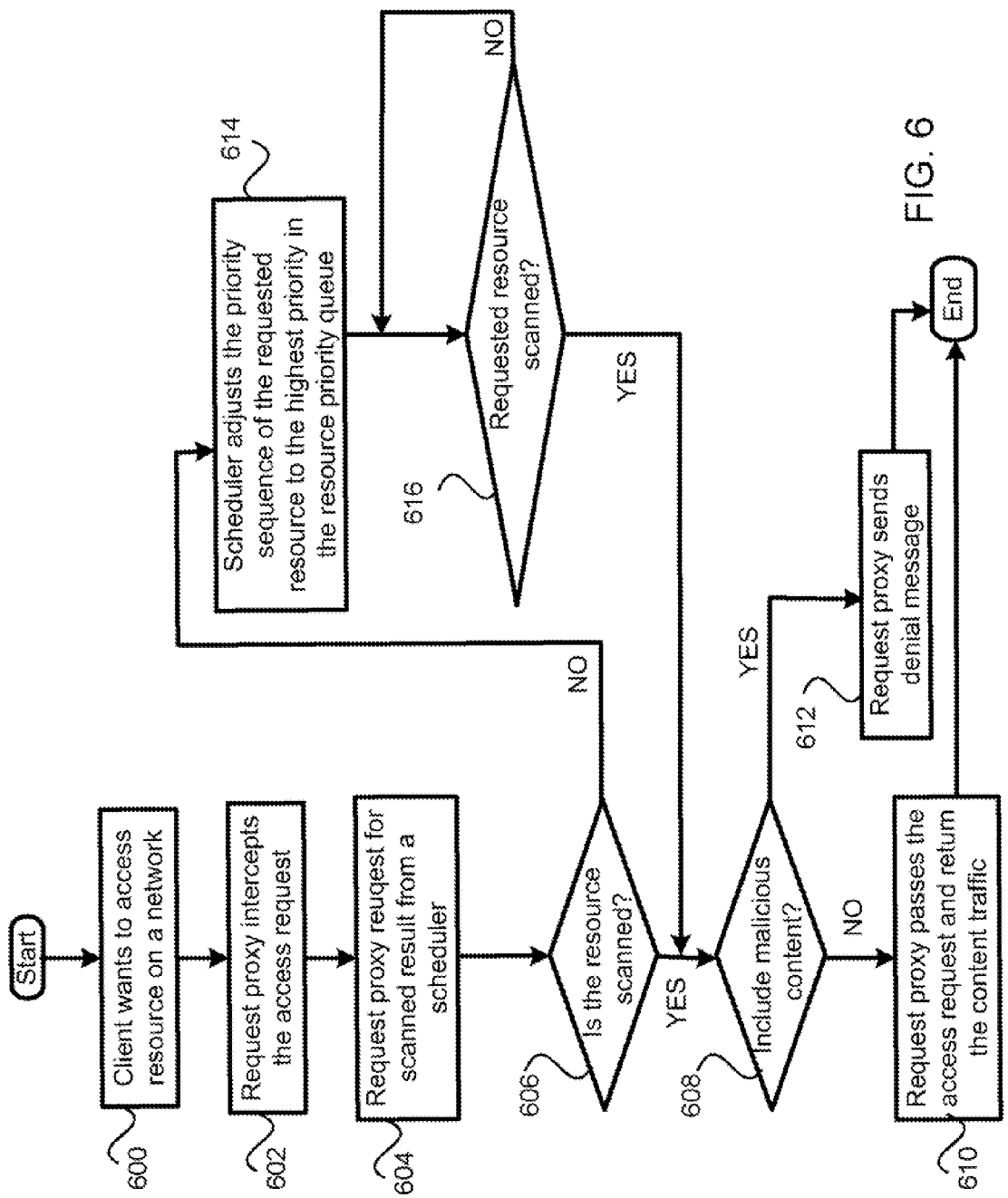
FIG. 6 shows, in an embodiment of the invention, a simple flow chart illustrating an example of how a SGSA may be employed to identify and handle malicious code in a network environment.

FIG. 6 shows, in an embodiment of the invention, a simple flow chart illustrating an example allow SGSA 512 may be employed to identify and handle malicious code in a network environment. FIG. 6 will be discussed using. FIG. 5 as an example.

At a first step 600, a client wants to access as shared resource on the network. Consider the situation wherein, for example, client 502 has requested access to a shared resource from set of shared resource 532.

At a next step 602, a request proxy may intercept the client's access request. In an example, request proxy 520 may intercept the access request for the resource from client 502. Unlike the prior art gateway scanning arrangement, access request is intercepted by the request proxy prior to being received by the server. In other words, server 530 may never process the access request if request proxy 520 determines that the requested resource includes malicious contents.

At a next step 604, the request proxy may request for the scan result of the requested resource from a scheduler. In an example, after intercepting the client's request, request proxy 520 may send a request via path 514 to scheduler 522 for the scan result of the requested resource.

At a next step 606, the scheduler may search a scan result database to retrieve the scan result, in an embodiment. As aforementioned, the SGSA 512 may include both a real-time scanning and a scheduled scanning functionality. In an example, a scan result for a resource may be available because the resource may have been previously requested by another user. In another example, the scan result for the resource may be available because the resource may have been scanned by the background scanner in accordance with the resource priority queue. As can be appreciated from the foregoing, the requested access may be asynchronous of the background scanning and the storing of the scan result. Once the scanning has been completed, the scan result may be stored inside a scan result database.

In an embodiment, the scan result database may be accessible to the SGSA 512. The scan result database may include data about the shared resources. Besides the scan result, the scan result database may also include the name of the resource, the size of the resource, the resource access frequency rate, the scan time consumption, and the like.

If the scan result is available, then the request proxy ma proceed to a net step 608. In an example, scheduler 522 may search the scan result database for the scan result of the requested resource. If the resource has been scanned, the scheduler may be able to handle the request proxy request for the scan result by retrieving the scan result from the scan result database and forwarding the scan result to the request proxy.

As can be appreciated from the foregoing, a satisfactory scan result for a resource may not be readily available in the scan result database. The lack of a satisfactory scan result may be due to various reasons. In an example, the resource may have a low priority score; thus, the background scanner has not scanned the resource because resources with higher priority score are ahead of the requested resources in the resource priority queue. In another example, the background scanner has recently been updated with a new virus pattern. As a result, previous scan result may be void and the scan status of the resources may be reset back to unscan, thereby requiring the background scanner to rescan the set of shared resources. In yet another example, a scan result for the requested resource may be available but may not be contemporaneously designated as a satisfactory scan result by the scan result database. As a result, the scan result may be deemed void and requested resource may have to be rescanned.

Referring back to step 606, if the scan result is not available, then at a next step 614, the scheduler may adjust the scan priority of the resource being requested to be the highest in the resource priority queue. In other words, scheduler 522 may change the priority score to move the requested resource to the head of resource priority queue 524. By changing the priority score, SGSA 512 may effectively accommodate real-time scanning when a requested resource has not yet been scanned. As can be appreciated from the foregoing, in a typical network environment, the scheduler may receive more than one request at any one time. In an embodiment, access requests may be asynchronous of the background scanning and/or the storing of the scan result in the scan result database. Thus, if the scan result is not available, then the scheduler may change the priority score of each requested resource and place each requested resource onto the resource priority queue in a FIFO manner.

At a next step 616, the scheduler may check to see if the background malware scanner has performed the scanning. Since background malware scanner 526 may be scanning the shared resource based on the order as presented by resource priority queue 524, the next resource that may be scanned by background malware scanner 526 may be the requested resource. To scan the requested resource, background malware scanner 526 may access the resource from the set of shared resources 532 by sending a request for the shared resource to server 530. Once scanning has been completed, background malware scanner 526 may forward the scan result to scheduler 522, which in turn forward the scan result to request proxy 520. Upon receiving the scan result, request proxy 520 may proceed to next step 608.

At next step 608, the request proxy may review the scan result for indication of malicious content.

If the content is malware-free, then at a next step 610, the request proxy may pass through the client access request and the returning content traffic. In other words, request proxy 520 may send the client's request to server 530 via communication channel 528. Upon receiving the client's request, server 530 may retrieve the requested resource from set of shared resources 532 and send the requested resource back through requested proxy 520 to client 502.

However, if the resource includes malicious content, then at a next step 612, the request proxy may send an error message (e.g., Access Denied message) to the requesting client. Additionally or alternatively, the network link between client 502 and network 500 may be terminated.

Figure 7:
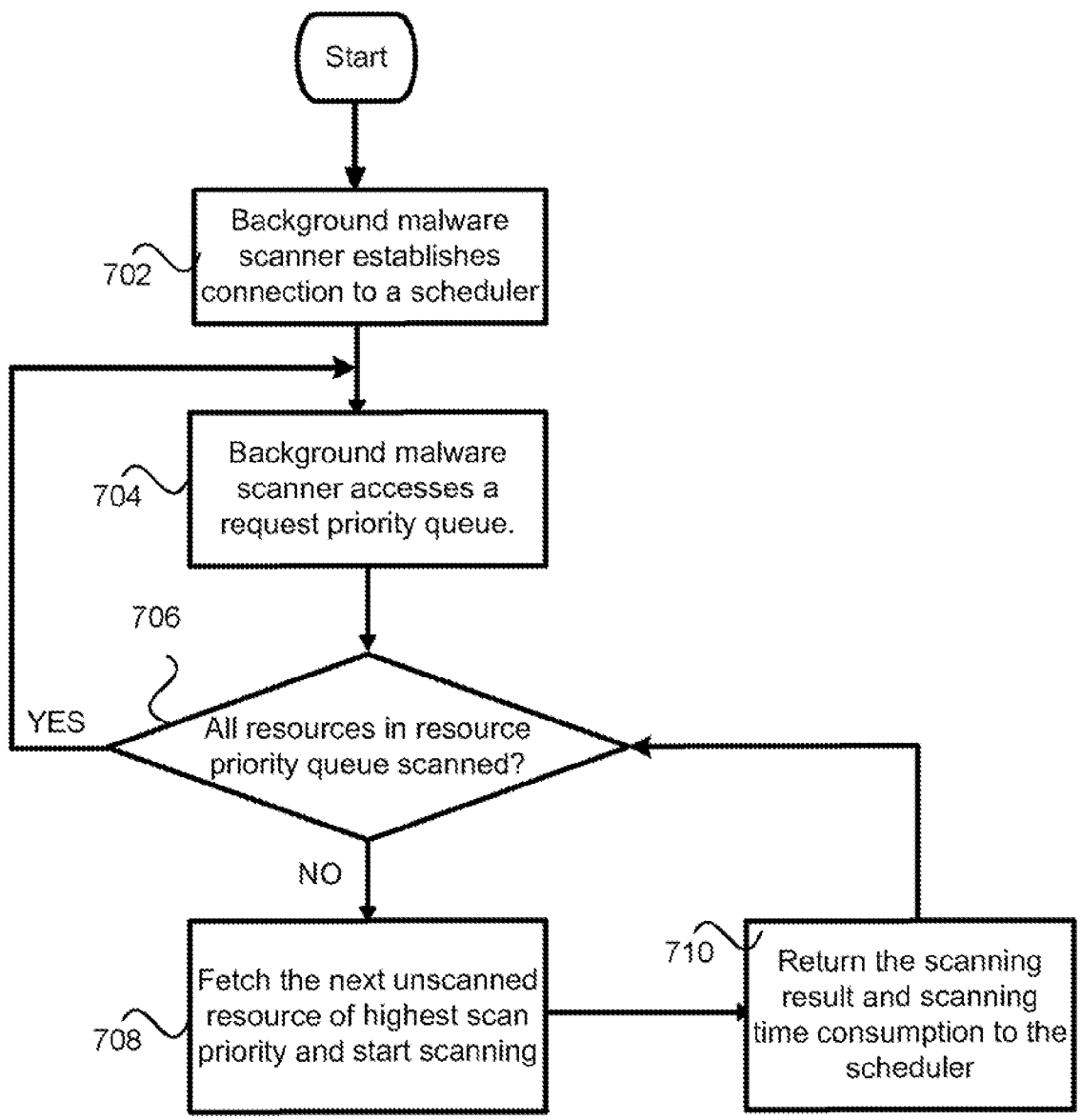
FIG. 7 shows, in an embodiment of the invention, a simple flow chart illustrating the interaction between a scheduler and a background malware scanner.

FIG. 7 shows, in an embodiment of the invention, a simple flow chart illustrating the interaction between a scheduler and a background malware scanner.

At a first step 702, a connection is established between a scheduler and a background malware scanner. By establishing a connection between the scheduler and the background malware scanner, the background malware scanner may be able to provide the scheduler with the scan result for each resource.

At a next step 704, the background malware scanner may access a resource priority queue. As aforementioned, the scheduler may perform an analysis for determining the scanning priority score for each resource in a set of shared resources. As can be appreciated from the foregoing, the priority score may be based on a set of criteria, including but not limited to, the size of the resource, the scanning time consumption, the access frequency rate, and the like. Further details about how the scheduler may set the priority score is provided in the discussion of FIG. 8. Once the priority score has been determined, the scheduler may create a resource priority queue, which is a schedule the background malware scanner may utilize to determine the order in which a resource may be scanned.

At a next step 706, the background malware scanner may make a determination regarding whether or not the resource priority queue includes resources that has not yet been scanned. In an embodiment, the resource priority queue may include a scan status. The scan status of a resource may be updated to that of "scanned" when a resource has been scanned by the background malware scanner and the scan result is still considered to be valid.

If all resources in the resource priority queue have been scanned, then the background malware scanner may return to step 704. As can be appreciated from the foregoing, the background malware scanner is not deactivated when all resources have been scanned. As can be appreciated from the foregoing, background scanning may be based on a statistical prediction of resources likely to be accessed. In an embodiment, the prediction may be based on a user's resource request pattern. In an example, if a user accesses a particular sport certain news website frequently, new news items from that same website and/or news items from other similarly suitable news sites may be back-ground scanned in anticipation that the user may visit the websites. In another embodiment, the prediction may be derived from a trend analysis of the behavior of other users and/or organizations that may share similar patterns. The sharing of this type of access pattern/data may be coordinated among the background scanners for various companies and such coordination may be provided via the internet, for example.

Since the SGSA also provides for real-time scanning, the background malware scanner may continuously check the resource priority queue to make sure that a new shared resource has not been added. Additionally or alternatively, the resource may be rescanned each time the background malware scanner database is updated with a new virus pattern. Thus, when a new virus pattern is received by SGSA 512, background malware scanner 526 may be updated with the new virus pattern. Since a new virus pattern has been loaded, the previous scan result may be considered invalid. Accordingly, the scan status of the resources in resource priority queue 524 may be reset to "unscan", thereby requiring the background malware scanner to rescan the resources in order to check for the new virus pattern.

Referring back to step 706, if all resources in resource priority queue have not yet been scanned, then at a next step 708, the background malware scanner may fetch the next unscanned resource of highest priority from the resource priority scanner to beam scanning. In an example, background malware scanner 526 may access server 530 to extract an unscanned resource with the highest priority from set of shared resources 532.

After scanning the resource, the background scanner may return the result to the scheduler, at a next step 710. In an embodiment, the background scanner may also return scanning time consumption to the scheduler. As discussed herein, scanning time consumption refers to the amount or time needed to scan a resource. As can be appreciated from the foregoing, with the scanning time consumption, the scheduler may be able to adjust the resource priority queue to allow resources that may have a longer scanning time consumption to have a higher priority score. As a result, request timeout may be minimized during real-time scanning since the resources with the longer scanning time consumption may have a higher priority score, thereby increasing the likelihood that the background scanner may have already scanned the resources by the time the resources are requested during real-time.

Once the results have been returned to the scheduler, the background malware are scanner may return to step 706 to retrieve the next highest priority unscanned resource.

As can be appreciated from the foregoing from the foregoing, the SGSA, as described in FIG. 5-7, provides for real-time scanning while minimizing request timeout. By implementing scheduled scanning that is based on a request priority queue, large and frequently-accessed resources may be pre-scanned to minimize the possibility of timeout. However, the SGSA is flexible in that the request priority queue may be adjusted to enable real-time scanning. As a result, the SGSA provides a content security solution that substantially eliminates the possibility of malicious content being spread throughout the network.

Figure 8:
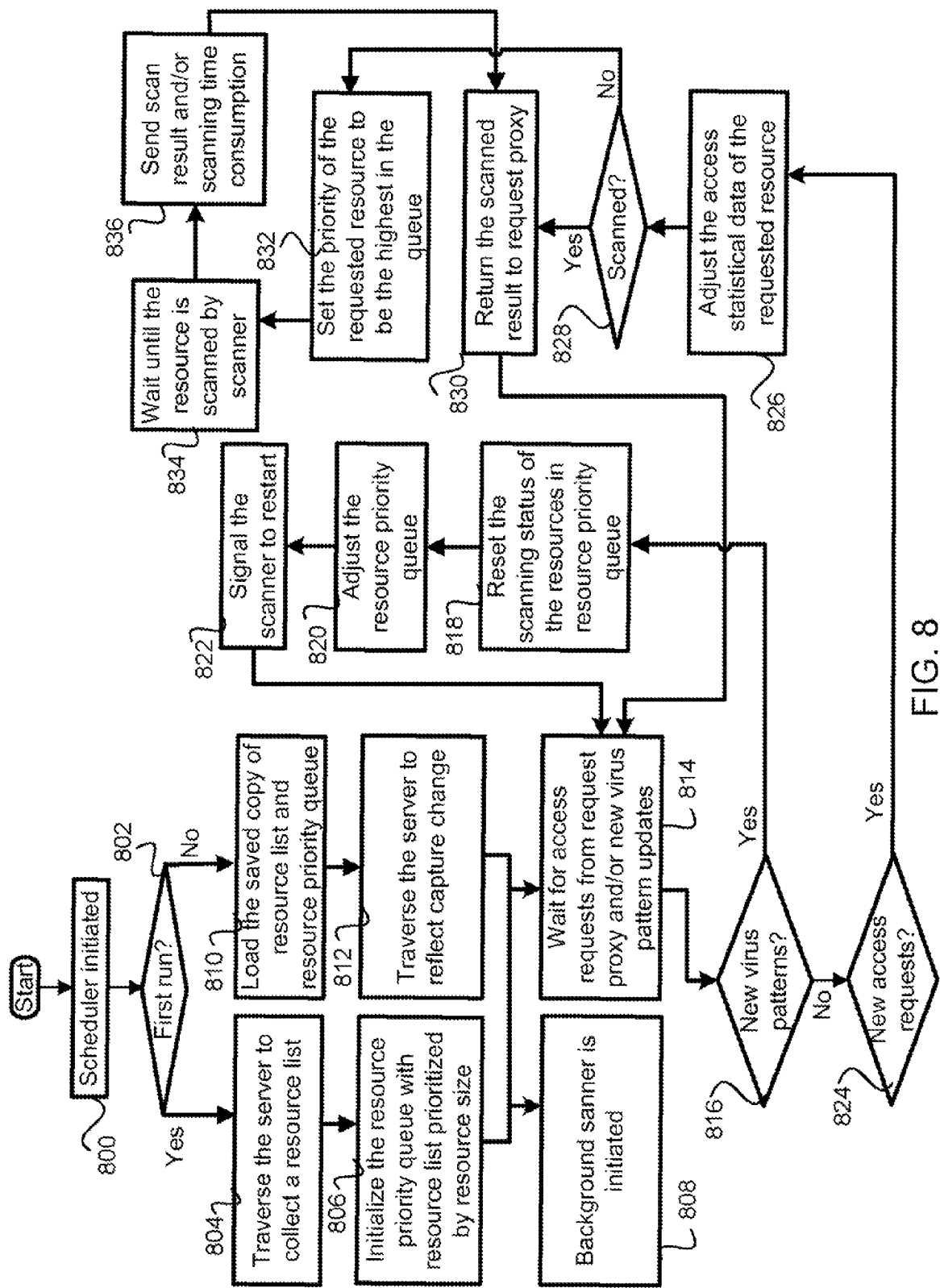
FIG. 8 shows, in an embodiment of the invention, a simple flowchart illustrating the implementation of a scheduler algorithm.

As aforementioned, the scheduler may employ a scheduler algorithm to determine a priority score. FIG. 8 shows, in an embodiment of the invention, a simple flowchart illustrating the implementation of a scheduler algorithm.

At a first step 800, a scheduler is initiated.

At a next step 802, the scheduler algorithm may determine whether or not the scheduler has been activated before.

If the scheduler is activated for the first time after installation, then at a next step 804, the scheduler may traverse the server to collect a resource list, which is a list of all shared resources saved on the server.

At a next step 806, the scheduler may employ the resource list to initialize the resource priority queue. In an embodiment, the priority score for the resource priority queue may be based on the size of the resource. In an example, resource A with a file size of 2224 kilobytes may have a higher priority than resource B with a file size of 100 kilobytes. In the initial stage of creating the resource priority queue, the scheduler may make an assumption that larger file size may have longer scanning time consumption. Since resources with longer scanning time consumption may cause request timeout during real-time scanning, the scheduler may initially arrange files with longer scanning time consumption to have higher priority in order to minimize the user's frustration.

At a next step 808, a background malware scanner may be activated to begin scanning based on the resource priority queue. The method for scanning may be performed in accordance with the aforementioned steps as described in FIG. 7 above.

Referring back to step 802, if the scheduler has been initiated before, then at a next step 810, the scheduler may load a saved copy of the resource list and the resource priority queue.

At a next step 812, the scheduler may traverse the set of shared resources to update the resource list in order to capture changes in the shared resources. Changes may include but are not limited to, a resource has been removed, a resource has been added, a resource has been updated, and the like. Once the resource list has been updated, the resource priority queue may also be adjusted to account for the changes in the resource list.

Once the resource priority queue has been updated, at next step 808, the background malware scanner may be activated to scan the resources in the resource priority queue.

In real-time, the scheduler may also be waiting for incoming access request from a request proxy, as shown in a next step 814. In an embodiment, the scheduler may also be waiting for a virus pattern update notification. Both of these events may cause the scheduler to adjust the resource priority queue.

At a next step 816, the scheduler algorithm may check to determine if a new virus pattern has been uploaded. As can be appreciated from the foregoing, when a new virus pattern is identified, the background malware scanner may be updated.

If a new virus pattern has been uploaded onto the background malware scanner, then at a next step 818, the scanning status of the resources in the resource priority queue may be reset to unscan.

At a next step 820, the scheduler may adjust the resource priority score. As can be appreciated from the foregoing, each time the resource priority queue is reset, the scheduler may readjust the priority score in order to account for changes that may have occurred since the last adjustment. As can be appreciated from the foregoing, the resource list that makes up the resource priority queue can become fairly extensive for a large company. By employing the resource priority queue, the scheduler is able to prioritize the shared resources so that the background malware scanner may be able to focus on resources that may statistically have been shown to have a higher access frequency and/or longer scanning time consumption. In an example, the priority score may be adjusted to reflect the recent resource scanning time consumption. In an example, resources that may have longer scanning time consumption may be given a higher priority. Additionally or alternatively, the priority score may be adjusted to reflect the behavior of the requesting clients. In an example, resources that has a higher resource access frequency rate (i.e., have been more frequently accessed) may have a higher priority than resources that mat have a lower resource access distribution.

In an embodiment, a weight may be given to the scanning time consumption and the access frequency rate to help determine the priority score. In an example, a first resource with a long scanning time consumption and a high frequency rate may have a higher priority status then a second resource that may the same scanning time consumption but may be infrequently accessed. In another example, a resource A with a scanning time consumption of 10 minutes and have a medium frequency rate may have a higher priority status then a resource B that may have a significantly less scanning time consumption but may have a very high frequency rate. As can be appreciated from the foregoing, the scanning time consumption of resource B is significantly smaller than that of resource A. Even though resource B may be accessed more frequently, resource B may have a lower priority since resource B may require less real-time scanning time than resource A, thereby reducing the possibility of request timeout.

At a next step 822, the scheduler may signal the background malware scanner that scanning may be restarted. In other words, once the resource priority queue has been adjusted and the scan status of the resources in the resource priority queue has been reset to unscan, the background malware scanner may begin a new scanning cycle. Once a signal has been sent to the background malware scanner, the scheduler may return to step 814 to wait for an access request from the request proxy and/or an updated virus pattern.

Referring back to step 816, if a new virus pattern has not been received, then the scheduler algorithm may check with the scheduler to determine if a new access request has been received from the request proxy, at a next step 824. If no new access request from the request proxy has been received, then the method may return to step 814 to wait for an access request from the request proxy and/or a new virus update.

If an access request has been received by the scheduler, then at a next step 826, the scheduler may adjust the access statistical data of the requested resource. In an embodiment, a scan result database may be provided to store the access statistical data. Additionally, the scan result database may store other data about the resources. Examples of data stored may include, but are not limited to, the name of the resource, the scanning time consumption, the access frequency rate, and the like.

At a next step 828, the scheduler may try to retrieve the scan result of the requested resource from the scan result database.

The resource has already been scanned, then at a next step 830, the scan result may be returned to the request proxy. Once the scan result has been sent to the request proxy, the scheduler may return to step 814 to wait for the next client's request and/or virus update.

Referring back to step 828, if the resource has not yet been scanned, then at a next step 832, the scheduler may adjust the priority status of the requested resource to that of the highest priority, thereby moving the requested resource to the head of the resource priority queue.

At a next step 834, the scheduler may wait for the requested resource to be scanned by a scanner. Once the background malware scanner has completed scanning the requested resource, the background malware scanner may send the scan result back to the scheduler, Once the scheduler has received the scan result, then at next step 836, the scheduler may forward the scan result to the request proxy and may return to step 814 to wait for the next access request and/or virus pattern update.

Additionally, at step 836, the background malware scanner may also send the scanning time consumption back to the scheduler, in an embodiment. Upon receiving the statistical data, the scanning time consumption may be saved in the scan result database. As aforementioned, the scanning time consumption may be employed by the scheduler to adjust the resource priority queue for the next scanning cycle.

As can be appreciated from the foregoing, one or more embodiments of the present invention provide for a scheduled gateway scanning arrangement (SGSA) to facilitate the management of access requests to shared resources. By implementing SGSA, the occurrence of request timeout is substantially minimized with scheduled scanning while real-time scanning substantially eliminate the possibility of a resource being released to a client without being properly scanned. Thus, SGSA reduces the spread of infected resources while lessening users' frustration. Further, the cost of implementing the SGSA is minimal since the SGSA may be implemented without hardware changes.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for performing content analysis of a plurality of resources, said method comprising:
    performing background content scanning on said plurality of resources based on a resource priority queue;
    creating, using a scheduler in a computing device, said resource priority queue, said resource priority queue being an order list of said plurality of resources based on a priority queue determined by said scheduler;
    employing said resource priority queue to determine priority for scanning said plurality of resources;
    storing already scanned resources of said plurality of resources in a scan result database;
    receiving a first access request asynchronously with said scanning and said storing; and
    if said first access request pertains to a given resource not contemporaneously designated as a satisfactory scan result according to said scan result database, granting said given resource a higher priority in said resource priority queue than resources remaining to be scanned in said plurality of resources, thereby enabling said given resource to be scanned by said set of scanners ahead of said resources remaining to be scanned.

2. The method of claim 1 further comprising:
    if said first access request pertains to a given resource contemporaneously designated as said satisfactory scan result according to said scan result database, providing a scan result associated with said given resource in response to said first access request without first performing content scanning of said given resource.

3. The method of claim 1 further comprising:
    handling, using a request proxy, said first access request for said given resource.

4. The method of claim 1 further comprising scanning, using a set of scanners, each of said plurality of resources for content, said resource priority queue being employed by said set of scanners to determine said priority for scanning said plurality of resources.

5. The method of claim 1 further comprising adjusting, using said scheduler, said resource priority queue based on at least one of scanning time consumption, file size, resource access frequency rate, and real-time access request.

6. The method of claim 3 wherein said request proxy is configured to interact with said scheduler to retrieve said scan result for said given resource of said plurality of resources.

7. The method of claim 3 further comprising:
    if said scan result indicates said given resource includes malicious content, sending an error message, using said request proxy, to a client that issues said first access request, and
    if said scan result indicates said given resource does not include said malicious content, sending said first access request to a server to enable said server to retrieve said given resource and sending said given resource back to said client.

8. An arrangement for performing content analysis of a plurality of resources, said arrangement comprising:
    a scheduled gateway scanning arrangement (SGSA), said SGSA including
    a set of scanners, said set of scanners being configured for performing content scanning on said plurality of resources based on a resource priority queue,
    a scan result database, said scan result database being configured for storing already scanned resources of said plurality of resources,
    a request proxy, said request proxy being configured to receive a first access request asynchronously with said content scanning and said storing, and
    a scheduler, said scheduler being configured for managing said resource Priority queue, said scheduler being further configured to create said resource priority queue, said resource priority queue being an order list of said plurality of resources based on a priority score determined by said scheduler, said resource priority queue being employed by said set of scanners to determine priority for scanning said plurality of resources; and
    circuits for performing one or more tasks associated with said SGSA.

9. The arrangement of claim 8 wherein said scheduler is configured to use a scheduler algorithm to create said resource priority queue.

10. The arrangement of claim 9 wherein said scheduler is configured to adjust said resource priority queue based on at least one of scanning time consumption, file size, resource access frequency rate, and real-time access request.

11. The arrangement of claim 10 wherein said request proxy is configured to interact with said scheduler to retrieve a scan result for said first resource of said plurality of resources.

12. The arrangement of claim 11 wherein said scheduler is configured to access a database to retrieve said scan result, wherein
    if said first access request pertains to a given resource contemporaneously designated as a satisfactory scan result according to said scan result database, providing a scan result associated with said given resource in response to said first access request without first performing content scanning of said given resource, and
    if said first access request pertains to a given resource not contemporaneously designated as said satisfactory scan result according to said scan result database, granting said given resource a higher priority in said resource priority queue than resources remaining to be scanned in said plurality of resources, thereby enabling said given resource to be scanned ahead of said resources remaining to be scanned.

13. The arrangement of claim 12 wherein said request proxy is configured to manage said first access request after retrieving said scan result from said scheduler, comprising:
   if said scan result indicates said first resource includes malicious content, sending an error message, using said request proxy, to a client that issues said first access request, and
   if said scan result indicates said first resource does not include said malicious content, sending said first access request to a server to enable said server to retrieve said given resource and sending said given resource back to said client.

14. A method for performing content analysis of a plurality of resources, said method comprising:
   performing background content scanning on said plurality of resources based on a resource priority queue;
   storing already scanned resources of said plurality of resources in a scan result database;
   receiving a first access request asynchronously with said scanning and said storing;
   if said first access request pertains to a given resource not contemporaneously designated as a satisfactory scan result according to said scan result database, granting, using a computing device, said given resource a higher priority in said resource priority queue than resources remaining to be scanned in said plurality of resources, thereby enabling said given resource to be scanned ahead of said resources remaining to be scanned; and
   if said first access request pertains to a given resource contemporaneously designated as said satisfactory scan result according to said scan result database, providing, using said computing device, a scan result associated with said given resource in response to said first access request without first performing content scanning of said given resource.

15. The method of claim 14 further comprising:
   providing a request proxy configured to handle said first access request for said given resource,
   providing a scheduler, said scheduler being configured to manage said resource priority queue, and
   providing a set of scanners, said set of scanners being configured to scan each of said plurality of resources for content.

16. The method of claim 15 wherein said scheduler is configured to use a scheduler algorithm to create said resource priority queue, said resource priority queue being an order list of said plurality of resources based on a priority queue determined by said scheduler, said resource priority queue being employed by said set of scanners to determine priority for scanning said plurality of resources.

17. The method of claim 16 wherein said scheduler is configured to adjust said resource priority queue based on at least one of scanning time consumption, file size, resource access frequency rate, and real-time access request.

18. The method of claim 17 wherein said request proxy is configured to interact with said scheduler to retrieve said scan result for said given resource of said plurality of resources.

19. The method of claim 15 further comprising:
   if said scan result indicates said given resource includes malicious content, sending an error message, using said request proxy, to a client that issues said first access request.

20. The method of claim 19 further comprising:
   if said scan result indicates said given resource does not include said malicious content, sending said first access request to a server to enable said server to retrieve said given resource and sending said given resource back to said client.

\* \* \* \* \*

UNITED STATES PATENT AND TRADEMARK OFFICE
CERTIFICATE OF CORRECTION

| | | |
|---|---|---|
| PATENT NO. | : 7,836,502 B1 | Page 1 of 1 |
| APPLICATION NO. | : 11/773072 | |
| DATED | : November 16, 2010 | |
| INVENTOR(S) | : Xiaoming Zhao et al. | |

It is certified that error appears in the above-identified patent and that said Letters Patent is hereby corrected as shown below:

Title Page, item (73)

Assignee: Trend Micro Inc. (Cupertino, CA) is incorrect. Please amend the assignee to read:

Assignee: Trend Micro Inc. (Tokyo, Japan)

Signed and Sealed this
Twenty-second Day of February, 2011

David J. Kappos
*Director of the United States Patent and Trademark Office*